July 21, 1959   W. W. NORTHGRAVES ET AL   2,895,801
PROCESS FOR PRODUCING CHLORINE DIOXIDE
Filed April 6, 1956
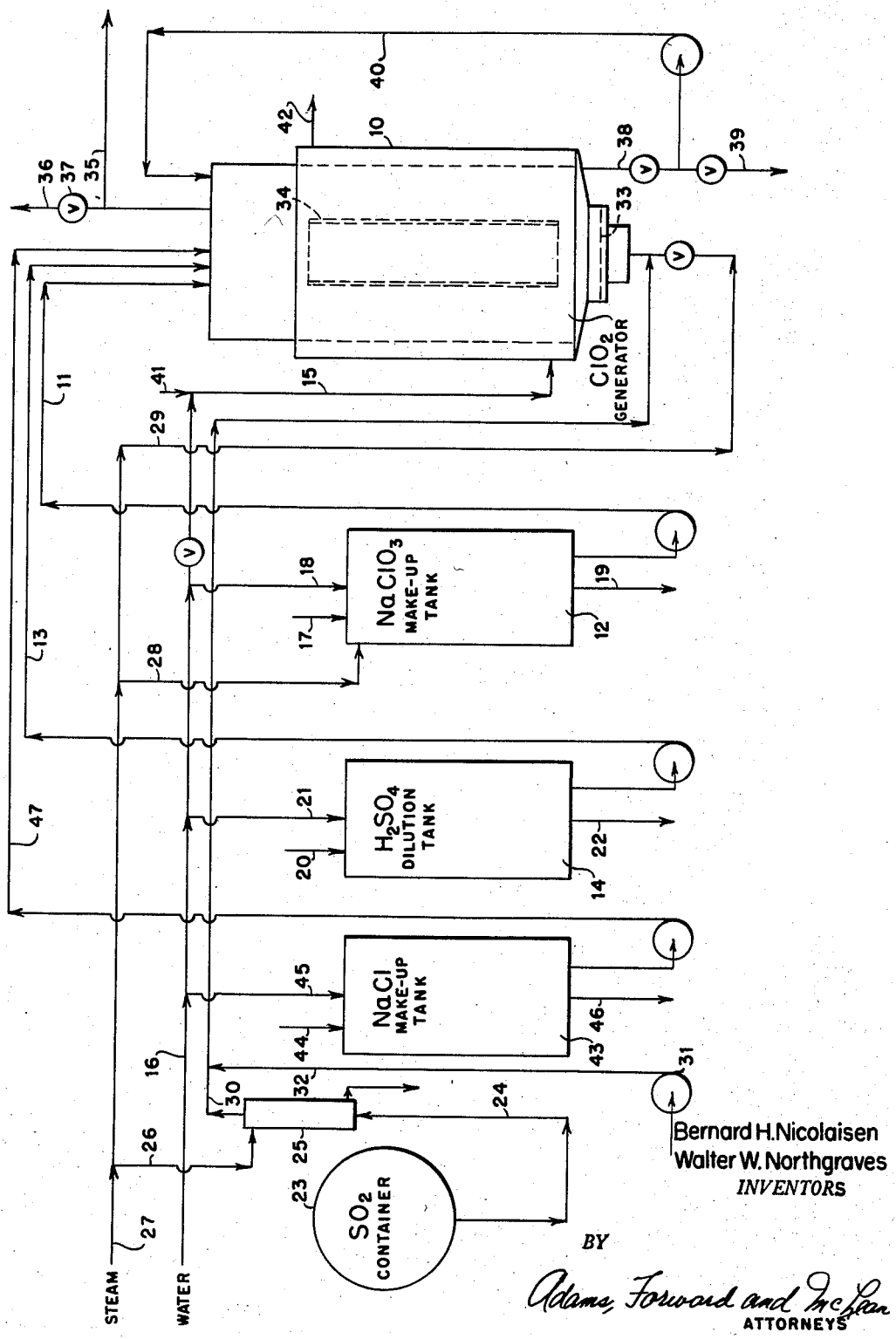
Bernard H. Nicolaisen
Walter W. Northgraves
INVENTORS
BY
Adams, Forward and McLean
ATTORNEYS

United States Patent Office 2,895,801
Patented July 21, 1959

2,895,801
PROCESS FOR PRODUCING CHLORINE DIOXIDE

Walter W. Northgraves, Baltimore, Md., and Bernard H. Nicolaisen, Kenmore, N.Y., assignors to Olin Mathieson Chemical Corporation, a corporation of Virginia Application April 6, 1956, Serial No. 576,579

15 Claims. (Cl. 23—152)

This invention relates to improvements in the generation of high quality chlorine dioxide from alkali metal chlorates and reducing agents, including particularly sulfur dioxide, methanol, sugars and spent sulfite liquor, in the presence of sulfuric acid. More particularly, it concerns an improved method for continuously or semi-continuously generating high quality chlorine dioxide in which the chlorate concentration is maintained in the generator at a suitably low level.

In the prior art of generating chlorine dioxide from these reagents, relatively high concentrations of chlorate, for example, from about 25 to 50 percent chlorate or from about 2.5 to 5 molar, have been used. The concentration of sulfuric acid has been found to be advantageously at least 2-normal or 1-molar. Less than about 5 percent by volume chlorine in the chlorine dioxide has been considered a good quality chlorine dioxide gas. This percentage is based on the chlorine and chlorine dioxide present since it is common practice to use air, nitrogen or other inert gas as a diluent for the chlorine dioxide.

More recently a good quality gas, within the above definition of that term, has been attained in a continuously operated process wherein a low concentration of chlorate is maintained in the generator. Solid chlorate or an aqueous solution of a chlorate is introduced continuously or intermittently. Sulfur dioxide is continuously charged to the reaction mixture and a suitable proportion of the reaction mixture is continuously or intermittently discharged from the generator. Sodium bisulfate or sodium sulfate may be recovered from the discharged liquor.

In the continuous process as previously practiced, the chlorate concentration in the generator liquor is maintained between about 0.1 and 0.5 molar and preferably in the range of about 0.12 and 0.25 molar. The sulfuric acid concentration is maintained between about 1 and 5.5 molar, and preferably in the range of 4 to 4.8 molar. Using a good quality of sodium chlorate or potassium chlorate, the chloride concentration in the liquor normally remains below about 0.1 molar, and under these conditions, the chlorine by volume in the chlorine dioxide is below about 5 percent.

In the continuous process as previously practiced, the chlorate concentration is advantageously maintained at a low limit because the volume of the liquor can then be maintained at a constant level by continuous or intermittent purging. The loss of chlorate in the purge may amount to as much as 10 percent of the chlorate charged or sometimes much less but averages about 5 percent of the chlorate charged.

The present invention is directed to reducing the loss of chlorate and to effect improvements in the continuous process whereby substantially all of the chlorate charged is converted to chlorine dioxide The chlorine dioxide gas produced is also of improved quality in containing substantially less chlorine than 5 percent by volume based on the chlorine and chlorine dioxide. It usually contains less than 1 percent chlorine on this basis.

The process of the present invention comprises the deliberate introduction into the reaction mixture of chlorine or an inorganic chloride, generally an alkali metal chloride such as sodium chloride or potassium chloride. The former can be introduced in the form of gas or as an aqueous solution of hypochlorous acid or as a hypochlorite, generally an alkali metal hypochlorite such as sodium hypochlorite or potassium hypochlorite. Chloride can be introduced, for example, as sodium chloride or hydrogen chloride and can be in the form of gas, solid or aqueous solution. Far from increasing the proportion of chlorine in the chlorine dioxide or of decreasing the yield of chlorine dioxide based on the chlorate charged, this improvement surprisingly yields chlorine dioxide of greater purity containing usually less than about 1 percent of chlorine and raises the conversion of chlorate to chlorine dioxide. In addition the chlorate concentration in the purge is reduced and averages about 1 percent of the chlorate charged. Since chloride appears to be an essential intermediate in the production of chlorine dioxide, its introduction is effective in conjunction with reducing agents such as those mentioned above.

In operating the improved process, the chlorate concentration in the generator liquor is maintained between about 0.01 and 0.5 molar and preferably about 0.03 to 0.2 molar. When the chlorate concentration in the liquor exceeds about 0.2 mole per liter, however, the percentage of chlorate in the effluent liquor tends to rise and the operation becomes less economical. The chlorate concentration should not be below about 0.01 molar in order to avoid the passage of sulfur dioxide or other reducing agent through the mixture without reacting.

The sulfuric acid concentration in the aqueous reaction mixture should be maintained at not less than 1-molar or 2 normal in order to obtain complete reaction at a reasonable rate. The sulfuric acid concentration, however, should not exceed about 5.5 moles per liter because at higher concentrations, foaming occurs. This is difficult to handle on a large scale and also the chlorine in the chlorine dioxide appears to increase. Preferably the sulfuric acid concentration is maintained at about 4.0 to 4.8 molar. The reaction is self-sustaining with respect to acid because of the formation of sulfuric acid by oxidation of the sulfur dioxide upon absorption, but if make-up sulfuric acid is not added to replace that discharged in the purge, the molarity drops below the preferred range resulting in a rise in chlorine content of the gas.

Chloride concentration in the reaction mixture is maintained between about 0.05 to 0.25 molar by the addition of chlorine or chloride. Using sodium chloride about 1 to 20 mole percent based on the moles of sodium chlorate charged is generally introduced. To obtain significantly improved results, about 1 mole percent or more, based on sodium chlorate charged, is required when sodium chloride is used. More than about 20 mole percent of sodium chloride, based on sodium chlorate, produces a considerable increase in the hydrogen chloride content of the exit gas and unnecessarily consumes sulfuric acid without effecting further improvement in the conversion of chlorate to chlorine dioxide.

The savings which can be effected by the use of the process of the present invention are material. For example, when sodium chloride is charged with sodium chlorate to the extent of 10 mole percent, thereby raising the yield of chlorine dioxide from 90 percent to 97 percent, the total chemical costs amount to 0.162 dollar per pound of chlorine dioxide. Without the chloride the chemical costs amount to 0.173 dollar per pound of chlorine dioxide. The saving resulting from the use of the chloride amounts to 0.011 dollar per pound of chlorine dioxide produced. This is a saving of about 7 percent in the cost of chemicals. In the operation of a large scale plant at ten tons per day, this saving amounts to about $70,000 per year.

Sulfur dioxide or other reducing agent such as methanol, diluted with air or other inert diluent gas, is charged to the acidified chlorate solution at a suitable rate to produce chlorine dioxide at a corresponding rate. For example, it is convenient to charge 5 liters per hour of sulfur dioxide and 40 liters per hour of air to about 2.5 liters of reaction mixture. This produces chlorine dioxide having a partial pressure of about 125 and 180 mm. and containing less than 1.5 percent chlorine. An 18 percent concentration of sulfur dioxide in air is produced by an ordinary sulfur burner, and this concentration produces a chlorine dioxide partial pressure of about 260 mm. The concentration of sulfur dioxide in air should not be raised above that producing a chlorine dioxide partial pressure above the explosive limit of about 300 mm.

The liquor discharged from the generator on cooling or on evaporation and cooling yields sodium bisulfate or sesquisulfate as a by-product. Where sodium sulfate is a desired by-product, the sodium bisulfate or sequisulfate or the liquor itself containing them can be neutralized, for example by the addition of caustic soda, soda ash or other suitable alkaline materials whether as solid or in solution. On cooling or on evaporation and cooling, sodium sulfate is obtained as a by-product and is removed by filtering, centrifuging or other conventional method.

To obtain the best quality gas, it is advantageous to maintain the temperature at about 25–35° C. although under some conditions it may be desirable to operate at lower or higher temperatures. Up to about 90° C. can be used under some circumstances and has been found entirely safe. However, where adequate cooling is available and sufficiently cheap, it is advantageous to operate at lower temperatures because the efficiency of the utilization of the chlorate is improved. Thus more chlorate is required to produce the same amount of chlorine dioxide as the temperature increases. In general, the high efficiency of this process is assured by very low losses in the form of chlorate and chloride in the waste liquid and as chlorine overhead. Increasing the ratio of sulfur dioxide to chlorate, conveniently controlled by rate of sulfur dioxide introduction, reduces chlorate losses up to the point at which sulfur dioxide comes through unreacted or the point at which the chlorate concentration of the effluent drops below 0.01 molar. The concentration of chloride maintained in the generator increases the conversion of chlorate to chlorine dioxide and results in the purge of less than 1 percent of the chlorate charged. Chlorine in the chlorine dioxide is reduced to about 1.5 percent or less based on the combined chlorine and chlorine dioxide.

Any suitable apparatus can be used but a particularly convenient form comprises a vertical tower in which gases are introduced through diffusers near the bottom. Advantageously the diffusers are placed below a smaller, concentric, vertical tube which acts as a gas lift to circulate the liquor upward in the smaller tube and downward in the space surrounding that tube. An overflow outlet for maintaining the reaction mixture at constant volume and also appropriate charging ports and gas outlets are provided.

The flow of materials and the arrangement of one type of generator are illustrated conventionally and somewhat diagrammatically in the accompanying drawing.

Chlorine dioxide generator 10 is charged with water and sodium chlorate through line 11 from sodium chlorate make-up tank 12 and with aqueous sulfuric acid through line 13 from sulfuric acid dilution tank 14. Generator 10 is jacketed as shown for temperature control and cooling water is supplied by line 15 from water line 16 or a source of raw water 41 and is discharged through line 42.

The sodium chlorate solution is made up in tank 12 by the addition of chlorate through 17 and the addition of water through line 18. Line 19 serves as a dump line. The acid solution is prepared in tank 14 by the addition of sulfuric acid through line 20 and water through line 21. Line 22 serves as a dump line. Both tanks are appropriately equipped with agitating means. The acid solution can be made up in a 2-stage system if desired for easier temperature control.

Sulfur dioxide is provided from container 23 which can be an ordinary 1-ton commercial container and line 24 to jacketed vaporizer 25 which is supplied with steam from steam manifold 27 by line 26. Steam connections 28 and 29 to tank 12 and generator 10 respectively are also provided for temperature control and to remove crystals if formed in the diffuser plate. The vaporized sulfur dioxide is mixed in line 30 with air supplied by air blower 31 through line 32. The mixture is introduced to generator 10 at the bottom, advantageously through diffuser 33. A concentric, vertical tube or chimney 34 is advantageously superposed above the diffuser inlet in the generator to obtain internal circulation of the reaction mixture. The chlorine dioxide gas mixture as produced is taken overhead through line 35 which is equipped with vent line 36 and safety valve 37. In operation, the reaction liquor is continuously or intermittently purged to an evaporator and sulfate recovery system (not shown) through lines 38 and 39. Recycle of the reaction liquor can be effected if desired through line 40.

Sodium chloride solution is made up in tank 43 by adding salt through 44 and water via line 45. Line 46 serves as a dump line. The solution is introduced into generator 10 by line 47. Metering devices (not shown) are provided on each feed line to the generator.

The operation is continuous or semi-continuous as desired and can be interrupted by discontinuing the flow of sulfur dioxide. The preparation of the acid, salt and chlorate solution can be continuous or intermittent as desired. Appropriate corrosion resistant materials are used in handling the acid, salt, chlorate and the chlorine dioxide. The chlorine dioxide is ordinarily directly used, or is charged directly to a process for producing sodium chlorite. If desired, it can be washed with water or constant boiling hydrochloric acid or chlorate feed solution to reduce the content of hydrogen chloride. The latter can be recovered and used as the chloride charge to the generator by distillation of the more concentrated wash medium until the distillation residue is reduced to the concentration of the constant boiling solution. Where the concentration of the hydrogen chloride in the gas is suitable, the gas can be dissolved directly in water to produce an acid chlorine dioxide solution suitable for bleaching.

The following examples represent typical operating runs employing the principles of this invention and illustrating production of high-quality chlorine dioxide. The examples are not intended to be otherwise limiting.

*Example I*

A reaction tower was arranged in which air and sulfur dioxide were admitted through a gas dispersion unit at the bottom. Sodium chlorate, sodium chloride and sulfuric acid feed lines were arranged to deliver these solutions just above the dispersion unit. An overflow line at the top of the tower served to permit continuous discharge of the reaction liquor. Cooling coils were placed inside the tower to maintain the reaction temperature at 30° C.

The reaction tower was originally charged with 9 normal sulfuric acid. Sodium chlorate was introduced as 5.7 molar solution at a rate of 2.83 millimoles of sodium chlorate per minute. Sodium chloride was introduced as 0.25 molar solution at a rate of 0.12 millimole of NaCl per minute. The sodium chloride amounted to 4.25 mole percent of the chlorate. Sulfur dioxide was introduced as an 8 percent gas diluted with 92 percent of air at the rate of 1.5 millimoles of sulfur dioxide per minute. Simultaneously 28.4 normal sulfuric acid was added to the tower at a rate which maintained the acidity of the reaction liquor at about 9.2 normal.

Analysis of the gas produced and the resulting liquor after equilibrium was established showed that 2.68 millimoles per minute of chlorine dioxide were being produced. This is a yield of 94.7 percent of chlorine dioxide based on the sodium chlorate charged. Residual sodium chlorate in the end liquor amounted to 2 percent of the sodium chlorate charged. The remaining 3.3 percent of the chlorate was overreduced yielding 0.4 millimole of chlorine and 0.2 millimole of sodium chloride per minute. The chlorine dioxide gas mixture was contaminated with chlorine only to the extent of 1.3 percent. In achieving this favorable yield, the resulting end liquor was 0.06 molar in sodium chlorate and 0.10 molar in sodium chloride.

*Example II*

The reactor of Example I was charged with 9 normal sulfuric acid. A solution of 5.7 molar sodium chlorate was introduced at a rate of 2.72 millimoles per minute of sodium chlorate and 0.25 molar sodium chloride solution was introduced at a rate of 0.11 millimole of NaCl per minute. The sodium chloride introduced was thus about 4 mole percent of the chlorate used. Sulfur dioxide, diluted to 8 percent with air, was introduced at a rate of 1.5 millimoles per minute. Simultaneously, 28.4 normal sulfuric acid was added at a rate which kept the reaction liquor at about 10 normal.

When the operation was in equilibrium at about 30° C., the effluent liquor contained 0.03 molar sodium chlorate, representing a loss of only 1 percent of the chlorate charged and contained 0.16 molar chloride. The 2.55 millimoles per minute of chlorine dioxide being produced amounted to a 93.8 percent yield based on the sodium chlorate charged. The remainder of the sodium chlorate was overreduced in part to chlorine to the extent of 0.4 percent and to chloride to the extent of 4.8 percent of the chlorate consumed. The chlorine dioxide contained 0.4 percent by volume of chlorine, based on chlorine dioxide and chlorine.

*Example III*

The reactor of Example I was charged with 9 normal sulfuric acid. Sodium chlorate solution having a concentration of 5.1 molar was introduced at the rate of 2.56 millimoles per minute and sodium chloride solution of a concentration of 0.5 molar was introduced at the rate of 0.25 millimole per minute of NaCl. The sodium chloride amounted to 9.75 mole percent of the chlorate. The molar ratio of sodium chlorate to sulfur dioxide was maintained at 1.8:1. A solution of 28.4 normal sulfuric acid was added at a rate to maintain the acidity of the reaction liquor at about 7.6 normal.

When the system was in equilibrium at about 31° C., chlorine dioxide was being produced at the rate of 2.49 millimoles per minute which corresponds to a yield of 97.3 percent based on the chlorate charged. The end liquor was 0.05 molar in sodium chlorate representing a 2 percent loss. The exit liquor was 0.13 molar in sodium chloride and 0.02 molar in chlorine. The chlorine produced amounted to 1 percent based on the chlorate consumed. No over-reduction to chloride occurred.

*Example IV*

The reactor of Example I was charged with 9 normal sulfuric acid. A sodium chlorate solution having a concentration of 5.1 molar was introduced at the rate of 2.28 millimoles per minute of $NaClO_3$. Sodium chloride solution having a concentration of 0.5 molar was introduced at the rate of 0.23 millimole per minute of chloride. The sodium chloride amounted to 10.1 mole percent of the chlorate. The molar ratio of sodium chlorate to sulfur dioxide was 1.8:1.

When the system was in equilibrium at about 33° C., the reaction liquor was about 9.5 normal in acid and contained sodium chlorate to the extent of 0.01 molar and chloride to the extent of 0.17 molar. Chlorine dioxide was being produced in a yield of 97.6 percent of the chlorate charged. Overreduction of chlorate to chlorine amounted to 0.7 percent and to chloride amounted to 1.1 percent. The chlorine content of the chlorine dioxide was 0.7 percent, based upon the volume of the two.

For comparison, a similar run was carried out omitting the addition of chloride. The apparatus of Example I was charged with 9 normal sulfuric acid. A sodium chlorate solution having a concentration of 6.7 molar was added at a rate of 2.2 millimoles per minute of $NaClO_3$. Sulfur dioxide, diluted to 8 percent with air, was introduced at the rate of 1.27 millimoles per minute of $SO_2$. Continuous addition of 28.4 normal sulfuric acid maintained the reaction liquor at a concentration of about 11 normal. The temperature was approximately 30° C.

When the system was in equilibrium, chlorine dioxide was being produced at the rate of 1.98 millimoles per minute together with 0.0525 millimole per minute of chlorine and 0.043 millimole per minute of chloride. The yield of chlorine dioxide based on the chlorate charged was only 90.2 percent.

*Example V*

The apparatus of Example I was modified by the addition of a chlorine gas inlet ending in a gas dispersion unit. The tower was charged with 9 normal sulfuric acid. Sodium chlorate solution was added at the rate of 5.41 millimoles per minute of $NaClO_3$. Chlorine gas was introduced at the rate of 0.53 millimole per minute and sulfur dioxide at the rate of 3 millimoles per minute. The exit gas comprised 5.21 millimoles per minute of chlorine dioxide, 0.05 millimole per minute of chlorine and 0.04 millimole per minute of hydrogen chloride. At the time the gas sample was taken, the reaction mixture was 4.3 molar with respect to sulfuric acid, 0.02 molar with respect to sodium chlorate and 0.28 molar with respect to chloride. The chlorine dioxide was being produced in a yield of 96.3 percent based on the sodium chlorate charged. Less than 1 percent of the sodium chlorate was lost in the exit liquor.

We claim:

1. In the manufacture of chlorine dioxide by reacting an alkali metal chlorate and a reducing agent selected from the group consisting of sulfur dioxide and methanol in an aqueous reaction mixture containing sulfuric acid, the step of introducing into the reaction mixture from an external source a material selected from the group consisting of chlorine and inorganic chlorides, adjusting the rates of introduction of alkali metal chlorate, reducing agent and said material into the reaction mixture so as to maintain the reaction mixture 0.01 to 0.5 molar with respect to alkali metal chlorate and 0.05 to 0.25 molar with respect to chloride and maintaining the reaction mixture from 1 to 5.5 molar with respect to sulfuric acid.

2. The method of claim 1 wherein said alkali metal chlorate is sodium chlorate.

3. The method of claim 1 wherein said reducing agent is sulfur dioxide.

4. The method of claim 1 wherein said chlorine is introduced into the reaction mixture in the form of gaseous chlorine.

5. The method of claim 1 wherein said chlorine is introduced into the reaction mixture in the form of an aqueous solution of hypochlorous acid.

6. The method of claim 1 wherein said chlorine is introduced into the reaction mixture in the form of an alkali metal hypochlorite.

7. The method of claim 1 wherein said chlorine is introduced into the reaction mixture in the form of sodium hypochlorite.

8. The method of claim 1 wherein said inorganic chloride is an alkali metal chloride.

9. The method of claim 1 wherein said inorganic chloride is sodium chloride.

10. The method of claim 1 wherein said inorganic chloride is hydrogen chloride.

11. The method of claim 1 wherein the reaction temperature is maintained between 25° C. and 90° C.

12. In the manufacture of chlorine dioxide by reacting sodium chlorate and sulfur dioxide in an aqueous reaction mixture containing sulfuric acid, the step of introducing sodium chloride into the reaction mixture from an external source, adjusting the rates of introduction of sodium chlorate, sulfur dioxide and sodium chloride into the reaction mixture so as to maintain the reaction mixture 0.01 to 0.5 molar with respect to sodium chlorate and 0.05 to 0.25 molar with respect to chloride, maintaining the reaction from 1 to 5.5 molar with respect to sulfuric acid and maintaining the reaction mixture at a temperature from 25° C. to 90° C.

13. The method of claim 12 wherein from 1 to 20 mole percent of sodium chloride is introduced into the reaction mixture from an external source, based upon the moles of sodium chlorate introduced into the reaction mixture.

14. In the manufacture of chlorine dioxide by reacting sodium chlorate and sufur dioxide in an aqueous reaction mixture containing sulfuric acid, the step of introducting sodium chloride into the reaction mixture from an external source, adjusting the rates of introduction of sodium chlorate, sulfur dioxide and sodium chloride into the reaction mixture so as to maintain the reaction mixture 0.03 to 0.2 molar with respect to sodium chlorate and 0.05 to 0.25 molar with respect to chloride, maintaining the reaction from 4.0 to 4.8 molar with respect to sulfuric acid and maintaining the reaction mixture at a temperature from 25 to 35° C.

15. The method of claim 14 wherein from 1 to 20 mole percent of sodium chloride is introduced into the reaction mixture from an external source, based upon the moles of sodium chlorate introduced into the reaction mixture.

References Cited in the file of this patent

UNITED STATES PATENTS

| | | |
|---|---|---|
| 2,317,443 | Cunningham | Apr. 27, 1943 |
| 2,373,830 | Holst | Apr. 17, 1945 |
| 2,510,034 | Haller | May 30, 1950 |

FOREIGN PATENTS

| | | |
|---|---|---|
| 537,557 | Great Britain | June 26, 1941 |
| 558,960 | Great Britain | Jan. 28, 1944 |
| 688,502 | Great Britain | Mar. 11, 1953 |